Figures 1, 2:
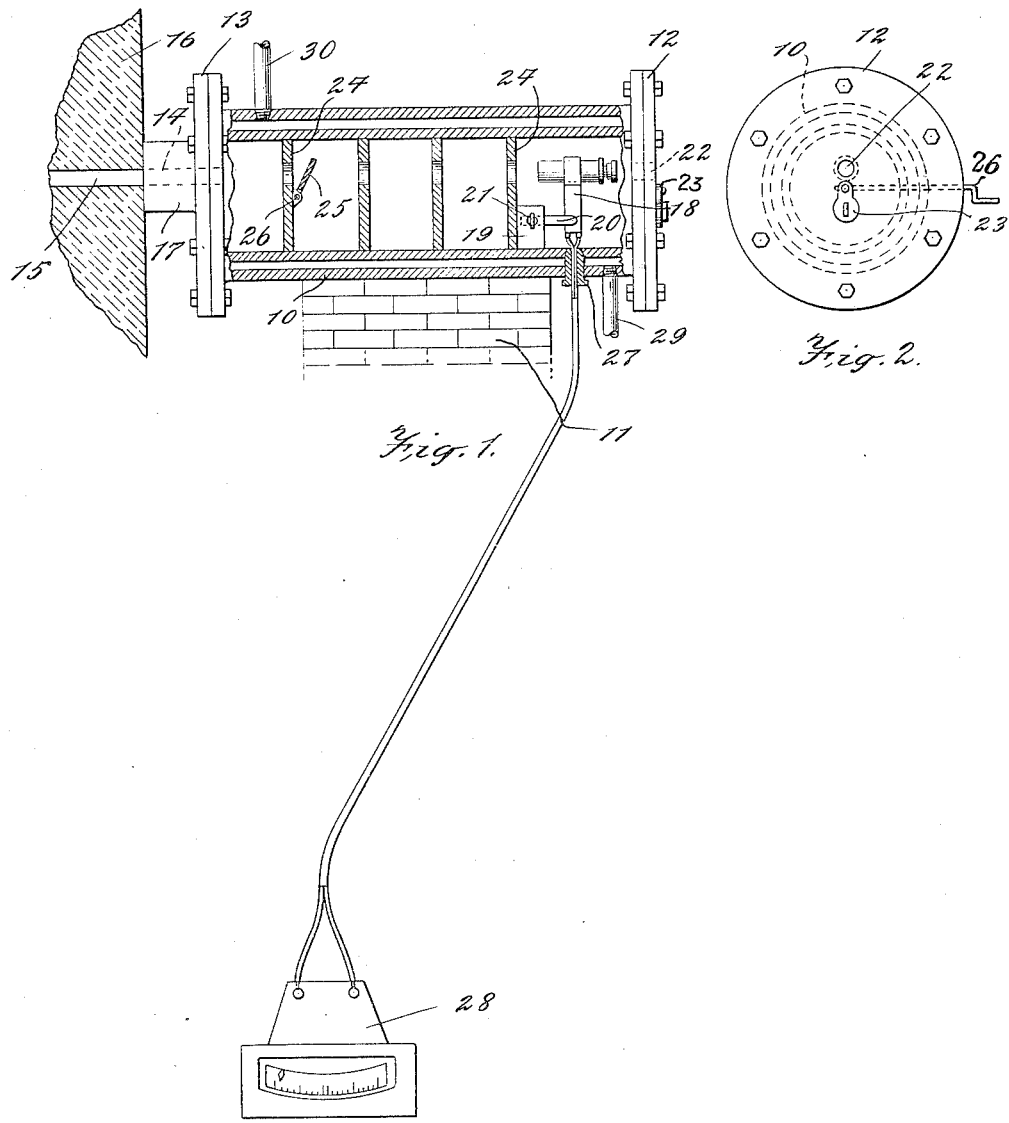

April 24, 1928.

F. H. NORTON 1,667,355

DEVICE FOR HOLDING PYROMETERS

Filed Feb. 7, 1925

INVENTOR.
Frederick Harwood Norton
BY
Gifford & Scull
ATTORNEYS

Patented Apr. 24, 1928.

1,667,355

UNITED STATES PATENT OFFICE.

FREDERICK H. NORTON, OF NEWELL, WEST VIRGINIA, ASSIGNOR TO THE BABCOCK & WILCOX COMPANY, OF BAYONNE, NEW JERSEY, A CORPORATION OF NEW JERSEY.

DEVICE FOR HOLDING PYROMETERS.

Application filed February 7, 1925. Serial No. 7,514.

In order that pyrometers of the radiation type may function accurately, it is essential that they have a relatively large field of view, and as large openings in the walls are undesirable, it is necessary to set the instrument close to the opening. In measuring the internal temperatures of kilns and other furnaces, it is customary to sight the instrument upon a small opening into the interior, such as a sight hole, or the like, constructed for that purpose. Because of the fact that such combustion furnaces are nearly always operated under a slight, positive pressure, there is necessarily some leakage through such sight hole or other opening. This flow of hot gases renders it impracticable to locate the pyrometer close to the opening, as, if the instrument is placed close enough to insure accurate readings, it will be injured by the excessive heat to which it is subjected.

It has been proposed to shield the instrument by means of windows of suitable material, but their use is attended with certain disadvantages, as they tend to become opaque due to the accumulation of dust and therefore are liable to impair the accuracy of the instrument.

My present invention relates to means for holding a pyrometer close to the sight hole of a kiln or the like, while preventing same from being injured by action of the gases escaping from the kiln. My invention will be best understood by reference to the following detailed description and to the accompanying drawing in which Fig. 1 represents a view partly in section of an illustrative embodiment thereof, and Fig. 2 is an end view.

In the drawing, 10 represents a double walled container mounted on a suitable support 11. Container 10 is provided with front and rear covers 12 and 13, respectively, and with a longitudinal passage 14 therethrough, the container being disposed so as to bring passage 14 in line with an opening 15 in a kiln 16. Cover 13 has preferably an extending portion 17 adapted to contact with the wall 16 of the kiln.

Adjacent the front end of the container 10, I have provided means for holding a pyrometer 18 of the radiation type, such means consisting of a block 19 having a bore accommodating an arm 20 attached to the pyrometer. Arm 20 is secured within block 19 by means of a set screw 21.

Cover 12 may be provided with a sight hole 22 and closure 23. For the purpose of preventing as much as possible the transfer of heat to the pyrometer, I preferably provide a plurality of spaced partitions 24 in container 10 each with an aperture registering with passage 14. These partitions 24 are useful in absorbing the stray radiant heat and transferring it to the outer jacket. They also shield the pyrometer from outside radiations and retard convection currents. On one of said partitions I conveniently locate a shutter, or closure 25 operated by means of a rod 26 passing to the exterior of the container 10. The electric wires from the pyrometer 18 are conducted through container 10 by means of a plug 27 to the indicating part 28 of the instrument. An inlet pipe 29 is provided for introducing a cooling medium to the jacket as well as exit pipe 30 for conducting such medium therefrom.

In use the pyrometer 18 is placed in sighting position with reference to the passage 14 and the container 10 is then disposed so as to bring passage 14 in line with the sight opening 15. Preferably extending portion 17 is brought tightly against the kiln exterior as shown. By momentarily opening shutters 25 and 23 the operator can sight through the instrument and make sure that it has been properly positioned. This having been done, shutter 23 may be closed whereby any circulation of the hot gases through the container is thus prevented. Moreover, during the intervals between readings (in case a continuous record is not desired) the pyrometer may be further shielded from the heat by closing shutter 25 although ordinarily shutter 25 may be left open. During operation water is preferably circulated through the jacket of the container 10.

It will be seen that by thus providing a gas tight container having within a radiation pyrometer, pressure in the container is equal to that in the kiln whereby circulation of the hot gases through the container is prevented. The pyrometer may therefore be brought extremely close to the sight hole without danger of overheating.

It will be understood that various changes may be made in the details of construction without departing from the spirit of the invention.

I claim:—

1. In a device for holding a radiation pyrometer or the like, a container having a passage therethrough, the rear end of said container being adapted for close association with a sight hole of a combustion kiln or the like, means in said container for holding a thermo-element in a sighting position with reference to said passage and with the sighting end thereof adjacent the front end of the container, and means for preventing circulation of gases from said kiln through said container.

2. In a device for holding a radiation pyrometer or the like, a container having a passage therethrough, the rear end of said container being adapted for close association with a sight hole of a combustion kiln or the like, means in said container for holding a thermo-element in a sighting position with reference to said passage and with the sighting end thereof adjacent the front end of the container, means in the container between the pyrometer position and the rear end of the container for retarding convection currents, and means for preventing circulation of gases from said kiln through said container.

3. In a device for holding a radiation pyrometer or the like, a container having a passage therethrough, the rear end of said container being adapted for close association with a sight hole of a combustion kiln or the like, means in said container for holding a thermo-element in a sighting position with reference to said passage and with the sighting end thereof adjacent the front end of the container, means comprising a jacket for cooling said container, and means for preventing circulation of gases from said kiln through said container.

4. In a device for holding a radiation pyrometer or the like, a container having a passage therethrough, the rear end of said container being adapted for close association with a sight hole of a combustion kiln or the like, means in said container for holding a thermo-element in a sighting position with reference to said passage and with the sighting end thereof adjacent the front end of the container, a shutter for said passage disposed between the pyrometer position and the rear end of the container, and means for operating said shutter exteriorly of the container.

5. In a device for holding a radiation pyrometer or the like, a container having a passage therethrough, the rear end of said container being adapted for close association with a sight hole of a combustion kiln or the like, means in said container for holding a thermo-element in a sighting position with reference to said passage and with the sighting end thereof adjacent the front end of the container, a shutter for said passage disposed between the pyrometer position and the rear end of the container, and means for operating said shutter exteriorly of the container and a second shutter for said passage forward of the pyrometer position.

6. In a device for holding a radiation pyrometer or the like, a container having a passage therethrough, the rear end of said container being adapted for close association with a sight hole of a combustion kiln or the like, means in said container for holding a thermo-element in a sighting position with reference to said passage and with the sighting end thereof adjacent the front end of the container, means in the container between the pyrometer position and the rear end of the container for retarding convection currents, means for preventing circulation of gases through said container except when the pyrometer is being initially aligned, and means for cooling said container.

7. In a device for holding a radiation pyrometer or the like, a container having a passage therethrough, the rear end of said container being adapted for close association with a sight hole of a combustion kiln or the like, means in said container for holding a thermo-element in a sighting position with reference to said passage and with the sighting end thereof adjacent the front end of the container and means comprising a jacket for cooling said container.

FREDERICK H. NORTON.